Feb. 18, 1930.　　　　J. K. WIRTH　　　　1,747,964
PROCESS OF UNITING PARTS OF ARTIFICIAL RESIN AND ARTICLE MADE THEREBY
Filed Jan. 3, 1927
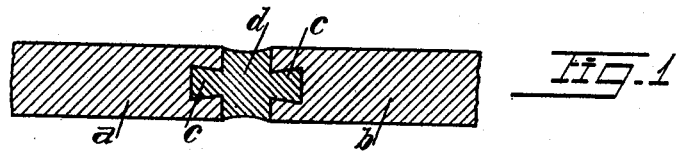
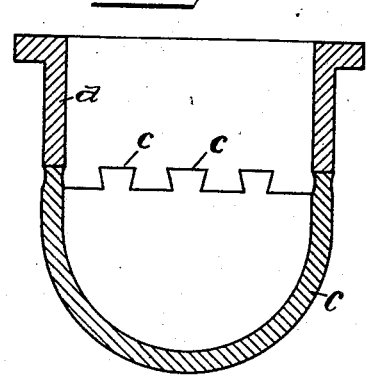
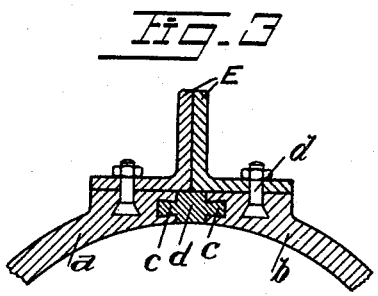
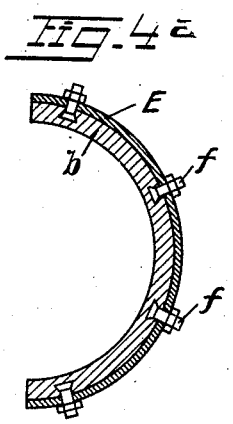
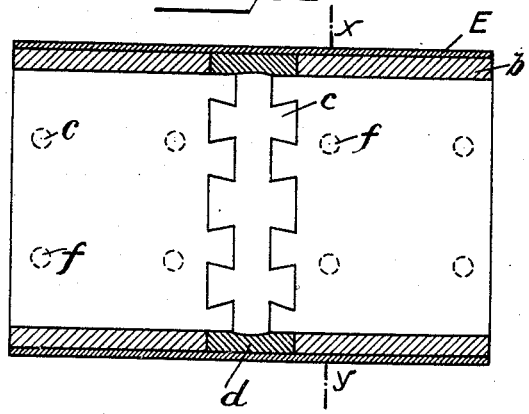
INVENTOR
Johann K. Wirth
by Langner, Parry, Card & Langner
Attys Patented Feb. 18, 1930

1,747,964

UNITED STATES PATENT OFFICE

JOHANN KARL WIRTH, OF BERLIN-ALTGLIENICKE, GERMANY

PROCESS OF UNITING PARTS OF ARTIFICIAL RESIN AND ARTICLE MADE THEREBY

Application filed January 3, 1927, Serial No. 158,809, and in Germany February 2, 1926.

In constructive work with artificial resins i. e., with hardened phenol-formaldehyde artificial resins the quite considerable shrinkage of material during the hardening process often has a serious effect. This shrinkage which is largely due to the separation of water and other volatile constituents during the condensation process may also, in connecting or joining separate artificial resin plates by means of un-hardened mixtures of phenol-formaldehyde condensation products and fillers, cause breakage of the joint in consequence of the expansion or contraction of the material. Such circumstances arise generally when the abutting edges or surfaces to be joined or connected are smooth. When the joint is only a few millimetres in width the shrinkage during hardening of the inserted artificial resin mixture used is sufficient to losen the joint more or less.

It has now been ascertained that this disadvantageous property of the material can be completely neutralized if the artificial resin surfaces or edges to be connected are homogeneously welded together in a manner such that they interlock. By homogeneous welding is meant the connection of the hardened artificial resin parts by means of similar but not hardened artificial resin products and subsequently hardening. By interlocking engagement is meant, in the present instance, the provision of the connecting seams or joints with recesses, holes, teeth or similar interlocking structures. With this method of connection the teeth, holes or the like grip the still plastic soft artificial resin material in such manner that during the gradual transformation from the plastic condition to the hard condition the shrinkage is compelled to take place in the direction of thickness of the joint and not in the direction of width of the joint.

In the accompanying drawing the process according to the invention is illustrated in: Figure 1 diagrammatically, Figure 2 on a frame with a curved bottom, Figure 3 on a container or the like being provided with iron reinforcements, and Figure 4 on an iron channel lined with artificial resin plates; Figure 4$^a$ is a section according to the line $xy$ in Fig. 4.

According to Fig. 1 $a$ and $b$ are artificial resin plates to be connected. The edges to be connected are provided with recesses $c$. The joint between $a$ and $b$ is filled with a plastic phenol-formaldehyde artificial resin mixture. After the hardening operation this jointing material $d$ presents a considerably narrowed portion resulting from the shrinkage of the material. If the recesses $c$ had not been provided the jointing material $d$ would have loosened from the edges of the artificial resin plates or there would have been considerable stress in the material in the joint which in course of time would have led to loosening of the joint.

As a second example, take an artificial resin frame with a curved bottom. In Fig. 2, $a$ denotes the frame consisting of artificial resin. The lower edge of this frame is provided with indentations or teeth $c$. The indentations are suitably of dovetail form or may be of another undercut form. The undercut form is, however, not essential. Now, the bottom $b$ is moulded of a suitable unhardened, i. e. plastic, artificial resin mixture on the frame in such manner that the soft material forms a good connection with the teeth. After the hardening operation the connection between the frame and bottom is as intimate as if the whole container were in one piece.

Circumstances may often arise where iron reinforcements are necessary for supporting the parts. Quite often shaped iron reinforcements are sufficient. As a third example, Fig. 3 shows such an arrangement. The construction is clear from the drawing in which $a$ and $b$ are curved artificial resin plates which are screwed to the angle irons $e$ by means of inserted screws $f$. The plates are formed on their edges with grooves or passages $c$ which serve to hold the inserted plastic jointing material $d$ during the hardening process.

In this manner, tubs, troughs or other apparatus and devices may be produced from artificial resin plates and shaped iron reinforcements.

Sometimes the shaped iron stiffeners are insufficient and the artificial resin plates must be supported by solid metal supports. The fourth example illustrates this arrangement in Figs. 4 and 4ᵃ showing an iron channel which is lined on its inner surface with artificial resin plates. In both figures *e* denotes the iron channel, *a* and *b* the inserted correspondingly shaped artificial resin plates which are screwed by screws *f* on the iron support. The abutting joints of the plates are formed with indentations, holes or other uneven portions in order to hold the jointing material *d* consisting of artificial resin during the hardening operation. The bolts with which the artificial resin plates are fastened to the iron base need not be of iron or other metal, but may be of artificial resin itself.

By the method described not only can artificial resin parts be connected with one another, but parts of other products can be connected with artificial resins.

I claim:

1. A method of connecting artificial resin plates or other artificial resin parts with one another or with parts of other materials for the purpose of forming containers, vessels or other hollow bodies, apparatus or parts of the same, consisting in providing the edges or surfaces to be connected with slots, recesses or indentations or other analogous forms, effecting the homogeneous connection or jointing with unhardened artificial resin masses, and hardening these masses.

2. A hollow body made of hardened artificial resin under conditions in which excessive shrinkage of the walls of said body occur in the process of hardening the same, comprising a wall of artificial resin having the connected edges thereof formed so as to adapt them to interlock, and a layer of artificial resin in the joint between said interlocking edges homogeneously welded to said edge to unite them.

3. A hollow body made of hardened artificial resin under conditions in which excessive shrinkage of the walls of said body occur in the process of hardening the same comprising plates of artificial resin, the joints of which are homogeneously welded together with artificial resin masses in interlocking engagement.

4. A hollow body made of hardened artificial resin under conditions in which excessive shrinkage of the walls of said body occur in the process of hardening the same, comprising a metal frame, and artificial resin plates secured to said frame, the joints of said plates being homogeneously welded together in interlocking engagement with artificial resin masses.

5. A hollow body made of hardened artificial resin under conditions in which excessive shrinkage of the walls of said body occur in the process of hardening the same, comprising a metal support having attached artificial resin plates, the connecting joints of which are welded together in interlocking engagement with artificial resin masses.

In testimony whereof I have signed my name to this specification.

JOHANN KARL WIRTH.